Jan. 14, 1941.　　　　　D. C. COX　　　　2,228,560
COMPENSATING CIRCUIT FOR PHOTOELECTRIC AMPLIFIERS
Filed Dec. 12, 1938

INVENTOR.
David C. Cox
BY Earl & Chappell
ATTORNEYS

Patented Jan. 14, 1941

2,228,560

UNITED STATES PATENT OFFICE 2,228,560

COMPENSATING CIRCUIT FOR PHOTO-ELECTRIC AMPLIFIERS

David C. Cox, Lowell, Mich., assignor to Electric Sorting Machine Company, Grand Rapids, Mich.

Application December 12, 1938, Serial No. 245,176

25 Claims. (Cl. 250—41.5)

The main objects of my invention are:

First, to provide an automatic compensating circuit for maintaining the setting or calibration of a sorting machine.

Sceond, to provide a circuit of the type described which is particularly adapted for restoring the setting of a photoelectric sorting machine in response to changes therein resulting from changes in applied voltage, illumination of the articles being sorted, or photo-tube sensitivity.

Third, to provide a circuit of the type described adapted for use in connection with a sorting machine employing a cathode ray tube to maintain the sweep of the cathode ray spot on the tube at a commercially desirable range.

Fourth, to provide a sorting machine having automatic means for compensating for variations of the type set forth above.

Fifth, to provide a compensating circuit for use in a photo-sensitive sorting machine using photo-tubes, whose sensitivity varies with the applied voltage.

Further objects relating to details and economies of my invention will definitely appear from the description to follow. The invention is defined in the claims.

In my copending application, Serial No. 222,787, filed August 3, 1938, I disclose and claim a bichromatic sorting machine involving as elements thereof a photoelectric scanning and amplifying circuit and a cathode ray tube adapted to have the output of the amplifier connected to the deflecting plate or plates thereof to thereby alter the position of the cathode ray beam in accordance with the reflectivity of an article being scanned by the photo-tube with reference to a plurality of colors. Experience has shown that a number of different factors, such as change in voltage of power supply, dimming of the illumination for the articles being scanned by the photo-tubes, for example, by dust accumulation, aging, or smoking of the lamps, or changes in sensitivity of the photo-tubes used for scanning, affect the results in cathode ray sorters of the type described. For example, unless some compensating means are provided, the sweep of the cathode ray spot from opposite extremes on the screen of the tube or from a position theoretically indicating the presence of a white standard before the scaning photo-tubes to a position indicating the presence of a black standard before the photo-tubes will vary from its originally set value or range to an extent to undesirably affect the sorting.

It is therefore a primary object of the present invention to provide an automatic compensating device or circuit for offsetting the changes mentioned above to the end that the sweep of the cathode ray beam will remain the same and thereby utilize the entire area of the cathode ray screen, with the further result that the sensitivity of the machine will be increased. Although particularly devised for use in connection with cathode ray machines as illustrated and claimed in the aforesaid copending application, it will be appreciated that the present circuit and device has utility for compensating for changes in photo-tube sensitivity, lamp brightness, voltage supply, and other factors as they affect other types of photoelectric scanning machines or devices.

A structure embodying the features of my invention is illustrated in the accompanying drawing, wherein.

Figure 1:
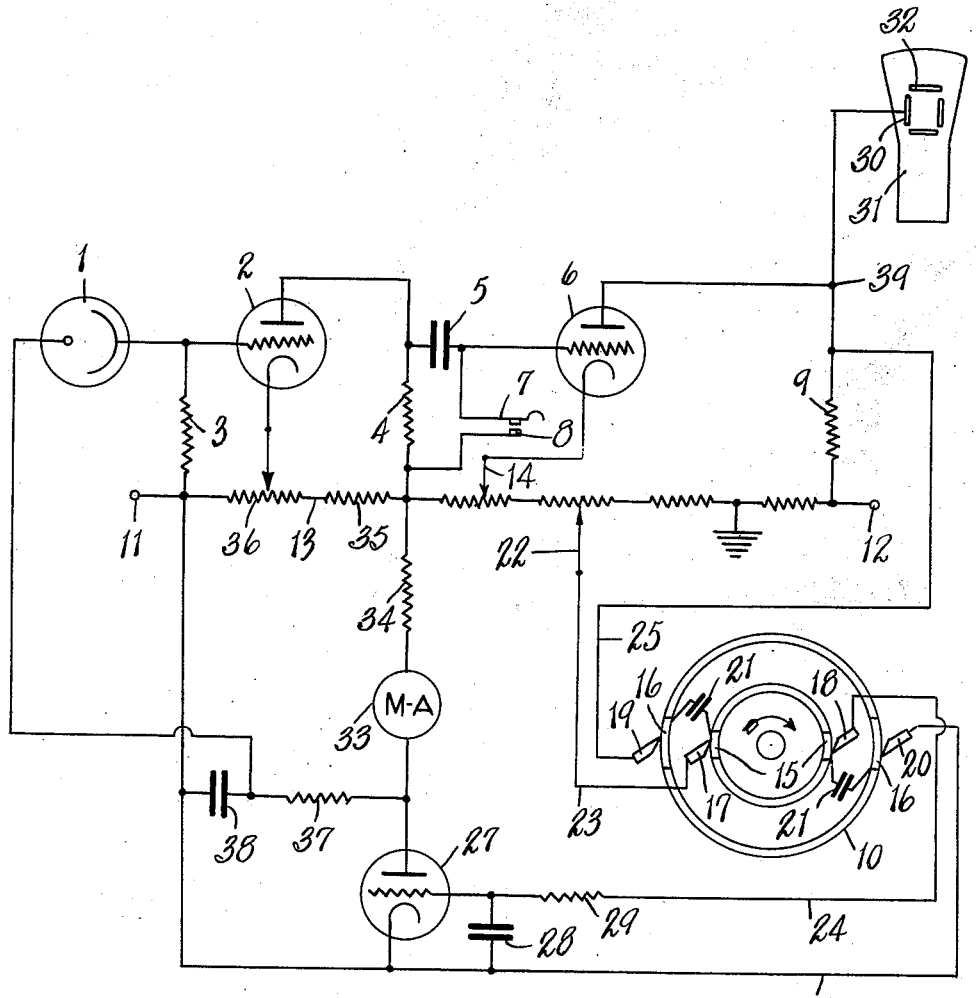
Fig. 1 is a view illustrating certain elements of a photoelectric sorting machine in operative relation to elements of my compensating device and the wiring diagram therefor.

It should be understood that in a sorting machine embodiment the photoelectric tube 1 is operatively disposed relative to a suitable conveyor (not shown) which transports articles past a viewing station. At this station, there is disposed an illuminating and viewing housing through which the articles are transported. The photoelectric tube is disposed in the housing as is also a suitable illuminating means (not shown) for uniformly illuminating the articles at the station. The aforesaid transporting and illuminating means form no part of the present invention and have not been illustrated since it is not desired to complicate the drawing, however reference may be had to my application, Serial No. 222,787, referred to above for a disclosure of one embodiment of an assembly of the aforesaid elements.

In the present device, it is necessary to provide periods during the operating cycle of the machine during which the scanning elements thereof view a standard of brightness such, for example, as a white object or surface, and, successively, a standard of darkness, for example, a black object or surface or simply an interruption of the illumination. These standards may be introduced in any desired manner and in any desired order or frequency sufficient to accomplish the purposes of my invention, as will be described. For instance, the white and black objects may be introduced during an interruption of the flow of articles being sorted on the conveyor, followed by the travel of, say, ten articles past the scanning means and a second presentation of the standards of brightness. Practical considerations of size and space will in most cases determine the cycle of scanning articles to be sorted and the standards of brightness to be used, but if space permits, it has been found desirable to scan standards and articles to be sorted alternately, staggering the order in which "white" and "dark" standards are presented.

The light-sensitive element of the tube 1 is connected to the grid of an amplifying tube 2 and when provided with a suitable voltage, as will be explained later, photo-tube 1 passes small currents essentially proportional to the brightness of the light received through a suitable filter (not shown) and impinging the sensitive surface of the tube. This current builds up proportional voltages across a photo-tube resistor 3, which voltages are led to the grid of amplifier tube 2 and serve in the usual manner to vary the drop across its plate resistor 4.

Tube 2 is capacity coupled by a condenser 5 to a second amplifier tube 6 and a suitable intermittently operated switch 7 is connected in shunt with the terminals of the condenser. This switch 7 is illustrated only diagrammatically and in actuality it preferably takes the form of a rotary switch driven in synchronism with the article conveyor and adapted to have the contacts 8 thereof closed when, and only when, photo-tube 1 is viewing a "white" standard of brightness. At this time, tube 6 receives a fixed predetermined bias from a voltage divider to be hereinafter described; i. e., it assumes a standard condition of grid bias regardless of lamp brightness etc. Switch 7 will be hereinafter referred to as a normalizer and its function is to cause tube 6 to pass the exact amount of plate current to produce a definite voltage drop across the resistor 9 when the "white" standard is being viewed. In my Patent No. 2,131,096 of September 27, 1938, and likewise in my above identified application, Serial No. 222,787, I disclose similar normalizers for a similar purpose. In practice, the rotary normalizer switch 7 may be constructed as a part of the commutator 10 which will be hereinafter described, however I have illustrated the same diagrammatically for the purpose of simplicity.

The reference numerals 11, 12 designate the terminals of a voltage divider generally indicated 13, which furnishes comparison voltages and energizing voltages for the tubes, as will be hereinafter described. The cathode of tube 6 is connected to the movable arm of a potentiometer 14 included in voltage divider 13, which, in conjunction with the normalizer 7, establishes the correct grid bias for amplifier 6 referred to above.

The diagrammatically illustrated commutator 10 carries a pair of axially alined, angularly spaced contact lugs 15 which are insulated from one another and a pair of further axially alined, angularly spaced contact lugs 16 which are insulated from one another, and also spaced axially and insulated from lugs 15, whereby the lugs 15 are successively contacted by brushes 17, 18 and the pair of lugs 16 by brushes 19, 20. It will be understood that the aforesaid lugs 15, 16 are all constructed on the outer periphery of the commutator, however they have been illustrated in concentric relation merely for the purpose of simplifying the drawing. Each lug 15 is in angular alinement with a lug 16 and connected thereto by a suitable condenser 21.

The brushes 17, 18, 19, 20 are connected respectively, through leads 23, 24, 25, 26, to the movable arm of a potentiometer 22, to the grid of an amplifier tube 27 through a filter consisting of a condenser 28 and resistor 29, to a point on the minus side of resistor 9 and to terminal 11 and the cathode of tube 27. Lead 25 connects to the output of tube 6, which is also impressed on a deflecting plate 30 of the diagrammatically illustrated cathode ray tube 31, as described in the copending application, Serial No. 222,787, referred to above.

It will be understood that cathode ray tube 31 has another plate 32 thereof connected to a photoelectric scanning and amplifying channel similar to that just described and as illustrated in my copending application, Serial No. 222,787. Thus, if a photo-tube 1 be considered as a tube receiving light through a green filter, then the duplicate circuit would amplify signals through a photo-tube receiving reflected light through a filter of a different color, for example, red. This involves an essential duplication of the above described amplifying circuit, although the voltage divider 13 may be made common to both. It will be appreciated that this duplication is necessary and that individual compensation is essential, because (a) individual photo-tubes do not increase in strength by the same amounts with a given rise in voltage, (b) individual photo-tubes could not be expected to match at the same voltage, and (c) should an illuminating lamp bulb turn brown, it would affect the "green" much more than the "red" photo-tube.

The plate of tube 27 is connected through a milliameter 33, the purpose of which will be hereinafter referred to, and through a resistor 34 to the voltage divider between potentiometer 14 and a resistor 35 on the voltage divider. A potentiometer 36 between resistor 35 and terminal 11 has the movable arm thereof connected to the cathode of amplifier tube 2. The plate of the tube 27 is also connected to the anode of photo-tube 1 through a filter consisting of a resistor 37 and condenser 38.

Prior to describing in detail the operation of the foregoing circuit in compensating for voltage variations in the sorting device, it is deemed advisable to sketch out broadly the theory upon which such operation is based and the general scheme of functioning of various elements of the device in accordance with that theory.

In the first place, if at any phase in the operation of the sorting machine the photo-tube 1 thereof is exposed to reflected light of a standard brightness, for example, pure white light, and the amplifying circuit conditioned arbitrarily at the instant of exposure to pass a predetermined voltage to the deflecting plate of the cathode ray tube, resulting in a predetermined maximum deflection of the cathode ray beam in one direction, then at another instant in the operation of the machine when the tube 1 is viewing reflected light opposite in brightness to the first named standard, for example, light reflected from a black surface, the voltage impressed by the amplifying channel in its normal operation on the same deflecting plate of the cathode ray tube will at that instant be exactly equal in magnitude but opposite in sign to that resulting when the white standard is viewed, and will swing the cathode ray beam to the opposite extreme of its range of movement. These two test voltages may be designated for convenience the "white test" voltage and the "black test" voltage.

If, however, due to illumination or the like, the "black test" voltage is different in amount from the arbitrary "white test" voltage, even though it be opposite in sign, it follows that the beam of the cathode ray tube will not be swung from the one extreme of its range resulting from the standard "white test" voltage to the opposite extreme as it should (remembering that two opposite standards of brightness have been viewed). Unless this discrepancy is compensated for, the machine will continue to operate at less than its full range of sensitivity and the results from the standpoint of efficiency, etc., will suffer accordingly.

The present compensating circuit proposes, therefore, to electrically record the discrepancy, if any, of the actual "black test" voltage from its theoretically acceptable value, which is as stated derived from the "white test" voltage, being equal in magnitude and opposite in sign to the latter. This electrically recorded discrepancy is then availed of to effect a correction of the photo-tube voltage such that when the test standards of brightness are viewed by the photo-tube the cathode ray tube beam will assume positions at opposite extremes of its range of movement. It follows that when articles of intermediate brightness and/or hue are viewed by the photo-tube the cathode ray beam will assume intermediate positions which reflect with great accuracy and sensitivity the brightness or color attribute of the article.

The means which I have provided to utilize the foregoing principle of operation include a predetermined standard voltage, for example, plus 85 volts, applied at the plus side of resistor 9 which, of course, acts in opposition to the plate voltage of tube 6, and the intermittent switch 7, whereby when the photo-tube 1 is viewing a white standard, the tube 6 will receive a predetermined bias from the voltage divider. Thus, tube 6 assumes a standard condition of grid bias regardless of lamp brightness at the viewing station, etc., and passes a predetermined amount of plate current to produce a definite voltage drop across resistor 9, i. e., at terminal 39, at the exact instant that the white standard is being viewed. The result is that the deflecting plate 30 takes a predetermined position at one extreme of its range across the screen of the cathode ray tube.

The article conveyor, on which the standards of brightness are preferably disposed, now rotates until the black standard is viewed by photo-tube 1. If it be assumed, as will be hereinafter explained, that the voltage drop over resistor 9 is 10 volts, hence that the voltage at terminal 39 is plus 75 volts when the white standard is viewed, it should of course be minus 75 volts when the black standard is viewed, assuming perfect or unobjectionable conditions of illumination, photo-tube voltage, and the like.

Whether any discrepancy in magnitude from the desired voltage of minus 75 volts exists is ascertained by comparing the voltage at terminal 39 when the black standard is viewed with an arbitrarily selected voltage corresponding in magnitude and sign to the theoretically perfect "black test" voltage, in this case minus 75 volts, this last named voltage being derived from a selected part of a voltage divider. The comparison is made by utilizing a condenser 21, connecting terminal 39 with one plate thereof and connecting the other plate thereof with an arbitrarily selected potential of minus 75 volts on the voltage divider, at the instant when the dark standard is viewed, so that if discrepancy exists, it will be recorded as a charge on condenser 21.

With a discrepancy so recorded on condenser 21, it is only necessary to apply this charge in such a manner as to correct for the variation in voltage which caused the same, and for this purpose the tube 27 and associated connections are employed. The charge on the condenser, if any, is led to the input terminals of tube 27. When the illumination for the sorting operation is at full brilliance and the classifier is operating at full voltage, this tube 27 has little bias and will run considerable current producing a predetermined photo-tube voltage, but when the charge of condenser 21 is applied to the grid of tube 27, it effects a variation in the plate voltage of that tube with a resultant variation in the photo-tube volage. This last named variation may readily be set to correct the discrepancy which originally set the compensating device to functioning, so as to result in a full swing of the cathode ray tube beam from one extreme of its range to the other when the opposite standards of brightness are viewed, and restore the classifier to its intended scope and sensitivity. A more detailed description of the operation follows.

As pointed out above, when a "white" standard is being viewed and switch 7 is closed, tube 6 passes exactly the correct amount of plate current to produce a definite drop across resistor 9. Assuming that the positive end of the voltage divider, i. e., terminal 12, is maintained at plus 85 volts and that resistor 9 has a value of 50,000 ohms and that the established bias of amplifier 6 is sufficient to pass 0.2 milliampere through resistor 9, there will be a drop of 10 volts in the resistor, bringing the potential at terminal 39 of resistor 9 to plus 75 volts. This is led to the "green" deflecting plate 30 of the cathode ray tube or tubes which are in use and it will be assumed that this voltage is or may be easily made sufficient to deflect the beam of the cathode ray tube to the desired "white" position, for example, to the position at the extreme side of the cathode ray tube screen designated by the reference character A.

At this moment photo-tube 1 and the first amplifier 2 can in no way influence the behavior of the second amplifier 6. Thus, should the illuminating lamp of the machine be extinguished while the machine is viewing the "white" standard, the cathode ray spot will remain in position A. Accordingly, this constitutes a reference point of considerable constancy and other values of illumination or reflection are measured as changes from this value. While viewing the "white" standard, a certain potential exists at the plate of tube 2, giving a difference of potential across the coupling condenser 5. After normalizer switch 7 opens, the changes in the plate voltage of tube 2 are transmitted inductively with rigorous fidelity through condenser 5, which maintains a constant difference of potential between the terminals.

Figure 2:
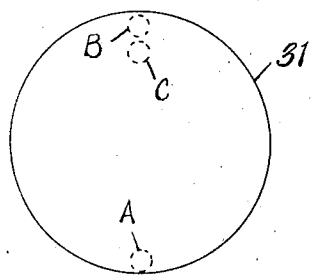
Fig. 2 is a view illustrating the screen of a cathode ray tube as embodied in my sorting machine, to more clearly illustrate the effect of the herein described compensating circuit.

The commutator 10 rotates in timed relation to the article conveyor (not shown) and is synchronized therewith so that the pairs of contact lugs 15, 16 engage brushes 17, 19 only while the photo-tube 1 is viewing the "black" standard. Thus, assuming brushes 17, 19 to be engaging lugs 15, 16, respectively, as illustrated in Fig. 1, the associated condenser 21 compares the potential at terminal 39 (which was assumed to be at plus 75 volts when the "white" standard was viewed, and which should therefore be at minus 75 volts when the "black" standard is viewed) with a selected part of potentiometer 22 which will be set for minus 75 volts. This comparison is made by applying voltage at terminal 39 to one plate of condenser 21 through lead 25, brush 19 and lug 16, and by applying the potentiometer or comparison voltage to the other plate of the condenser through lead 23, brush 17, and lug 15. If terminal 39 is at minus 75 volts, the swing from "white" to "black," i. e., 150 volts, is exactly sufficient to swing the cathode ray beam across its field from position A to an opposite position designated by the reference character B in Fig. 2. If terminal 39 is at requisite voltage, condenser 21 will not be charged and nothing will happen. But if the photoelectric sensitivity should be abnormal, condenser 21 will carry a charge whose polarity indicates the direction of the discrepancy and whose intensity indicates its amount.

Assume now that the illuminating lamp for the articles being sorted becomes 2% dimmer. The immediate effect is to bring the voltage at terminal 39 when the "black" standard is viewed not to minus 75 volts, the correct voltage to assure full swing of the beam to an extreme position B, but, say, to minus 72 volts. This will normally be sufficient only to swing the beam to a position such as is designated by the reference character C. However, at this instant, a charge of about 3 volts, i. e., the discrepancy between the voltage at terminal 39 and the arbitrary comparison voltage is placed on condenser 21 through brush 19, the lug 16 and corresponding condenser plate being positive relative to lug 15. In this charged condition, condenser 21 rotates to a position in which the lugs 15, 16 engage brushes 18, 20, respectively. Here, the potential level of the condenser is established at a low negative value by the direct connection of brush 20 with terminal 11, which is the negative terminal of the voltage divider. Any charge on the condenser is led to the input terminals of tube 27. Thus, in the example chosen, condenser 21 puts a negative charge on the grid of tube 27 through filter elements 28, 29, which in turn varies the plate current flowing through milliameter 30 and plate resistor 34.

The photo-tube 1 always receives its polarizing voltage from the terminals of condenser 38, which in turn obtains its voltage from the drop in voltage divider resistor 35 and potentiometer 36. These are proportioned to total about 90 volts and from this drop there is always subtracted the drop in resistor 34 caused by the plate current from tube 27. When the illuminating lamp or lamps are at full brilliance, the tube 27 will have little bias, will operate practically with the grid floating, and will run considerable current. This will have the effect of dropping the photo-tube voltage from 90 to, say, 70 volts. It is pointed out at this time that the photo-tube 1 is preferably one which contains a small amount of gas and whose sensitivity varies widely with the polarizing voltage. Alternatively, a photo-tube furnishing an exceedingly strong signal, such as a tube of the secondary emission type, may be employed, and it is to be understood that a scanner of this sort is well adapted to the present circuit just as is any photo-tube whose sensitivity varies with the applied voltage. In the present embodiment, when condenser 21 brings a negative charge, as previously described, and applies it to the grid of tube 27, the plate current thereof, in opposition to the photo-tube polarizing voltage, will drop; i. e., the voltage applied to the photo-tube will increase. If tube 27 be a high mu triode, the change in its plate current will constitute quite a large correction of the photo-tube voltage, possibly more than sufficient to bring the photoelectric signal up to full value. If this is the case, the next condenser to reach brushes 18, 20 will bring a reverse change causing tube 27 to run considerable current. In order to smooth out the control and preclude hunting of the compensator or regulator, values of condenser 28 and resistor 29 need only be increased.

Further filtering by resistor 37 and condenser 38 prepares the voltage for direct application to the photo-tube terminals. It will be apparent that by suitable selection of the time constants for the two filter circuits response may be made very slow, so as to obtain response only to a persistent change in brightness, or quite fast if that type of response is more suitable for the power supply at hand. I desire to point out that by using potentiometer 22 for an accurate check of the voltage drop from "white" to "black" instead of, for example, a "B" battery, I obtain a more practical and flexible compensation. In the event a battery were used for this purpose, a very constant standard would be had, which might be made to hold the aforementioned 150-volt range within a very small variation. However, it should be noted that in case the line voltage rises, for example, 1%, the deflection of the cathode ray beam from "white" to "black" positions will not require 150 volts, but 151.5 volts. Utilizing voltage obtained from the potentiometer 22, my device immediately makes the necessary correction, inasmuch as all drops in the voltage divider will rise by 1%. In other words, it is not necessarily an object of my device to hold the swing from "white" to "black" at exactly 150 volts, but it is an object to maintain the voltage impressed on the cathode ray tube while the standards are being viewed at the precise point which will displace the beam from position A to position B, even when the cathode ray tubes deflection sensitivity has changed.

Milliameter 33 is useful as a tool to indicate when faulty illuminating lamps should be replaced. Thus, it is well to place a conspicuous red line on the meter scale to remind the operator, when the milliamperes approach zero (tube cut-off), that the photo-tube is turned up to full power and the machine will be unable to obtain a perfect setting automatically until the old lamp is replaced or the light otherwise brightened.

An advantage of my circuit, which is not at once apparent, is the fact that while the control is very flexible and has great latitude, it cannot put excess voltage on any photo-tube, even momentarily.

From the foregoing, it will be seen that I have provided an automatic compensating circuit of great accuracy, and experience has shown that it maintains the machine setting with greater accuracy than is possible even when utilizing the best voltage regulators available. This in turn is due to the fact that variations in the signal forwarded by the photo-tube arise from other factors than merely variations in the voltage impressed on the tube, i. e., variations caused by entrance of daylight into the somewhat open lamp housing, which dies down at nightfall, accumulation of dust on the illuminating lamp and reflecting surfaces, aging of the lamp, change in photo-tube sensitivity, which is not always due to change of photo-tube voltage, and change in photo-tube resistor values which are of very high value and are sensitive to vibration and humidity.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A device for automatically compensating for voltage variations in a photoelectric sorting device of the type including a photoelectric scanning tube and thermionic amplifier therefor and a cathode ray tube adapted to have the amplifier output impressed on a deflecting plate thereof, said device comprising a voltage divider for supplying operating potential to the scanning tube and amplifier, a normalizer switch adapted to periodically establish a bias on the amplifier sufficient to produce a predetermined output voltage when a given brightness standard is being viewed by the scanning tube, said output voltage being sufficient to produce a predetermined deflection of the cathode ray beam relative to the screen of the tube, a rotatable commutator having a condenser thereon and conducting lugs connected to the respective plates of said condenser, a brush engaging one of said commutator lugs and adapted to impress the plate potential of said amplifier on one of the condenser plates when the scanning tube is viewing another standard of brightness, a second brush adapted to engage another commutator lug and connected to a predetermined point on said voltage divider to impose a predetermined comparison potential on the other plate of said condenser when the scanner tube is viewing said last named standard, an amplifier tube, further brushes adapted to engage said lugs upon rotation of said commutator and connected to the input terminals of the amplifier tube whereby to vary the voltage passed by the same in accordance with the intensity and direction of the commutator charge in the event the condenser is in charged condition, and means connecting the plate of said last named amplifier tube with the anode of said scanning tube and in opposition to the flow of polarizing voltage thereto from the voltage divider whereby to effect corrections in the scanning tube voltage in accordance with the condition of the commutator condenser.

2. A device for automatically compensating for voltage variations in a photoelectric sorting device of the type including a photoelectric scanning tube and thermionic amplifier therefor and a cathode ray tube adapted to have the amplifier output impressed on a deflecting plate thereof, said device comprising a voltage divider for supplying operating potential to the scanning tube and amplifier, means to periodically establish a bias on the amplifier sufficient to produce a predetermined output voltage when a given brightness standard is being viewed by the scanning tube, said output voltage being sufficient to produce a predetermined deflection of the cathode ray beam relative to the screen of the tube, a rotatable commutator having a condenser thereon and conducting lugs connected to the respective plates of said condenser, a brush engaging one of said commutator lugs and adapted to impress the plate potential of said amplifier on one of the condenser plates when the scanning tube is viewing another standard of brightness, a second brush adapted to engage another commutator lug and connected to a predetermined point on said voltage divider to impose a predetermined comparison potential on the other plate of said condenser when the scanner tube is viewing said last named standard, an amplifier tube, further brushes adapted to engage said lugs upon rotation of said commutator and connected to the input terminals of the amplifier tube whereby to vary the voltage passed by the same in accordance with the intensity and direction of the commutator charge in the event the condenser is in charged condition, and means connecting the plate of said last named amplifier tube with the anode of said scanning tube and in opposition to the flow of polarizing voltage thereto from the voltage divider whereby to effect corrections in the scanning tube voltage in accordance with the condition of the commutator condenser.

3. A device for automatically compensating for voltage variations in a photoelectric sorting device of the type including a photoelectric scanning tube and thermionic amplifier therefor and a cathode ray tube adapted to have the amplifier output impressed on a deflecting plate thereof, said device comprising means for supplying operating potential to the scanning tube and amplifier, a normalizer switch adapted to periodically establish a bias on the amplifier sufficient to produce a predetermined standard output voltage for the amplifier when a given brightness standard is being viewed by the scanning tube, said output voltage being sufficient to produce a predetermined deflection of the cathode ray beam relative to the screen of the tube, a rotatable commutator having a condenser thereon, a brush connected to said amplifier and engaging said commutator, said brush being adapted to impress the plate potential of said amplifier on one of the condenser plates when the scanning tube is viewing another standard of brightness, a second brush engaging said commutator and adapted to impress a predetermined comparison potential on the other condenser plate when the scanner tube is viewing said last named standard, and means controlled by said commutator to periodically vary the voltage applied to said scanning tube in accordance with the charge on said condenser when said plate potential exceeds said comparison potential or vice versa.

4. In a photoelectric sorting device of the type including a photoelectric scanning tube and a thermionic amplifier therefor, a device for automatically maintaining the setting of the machine comprising a voltage divider for supplying operating potential to the scanning tube and amplifier, a normalizer switch adapted to periodically establish a bias on the amplifier sufficient to produce a predetermined standard output voltage for the amplifier when a given brightness standard is being viewed by the scanning tube, a rotatable commutator having a condenser thereon, a brush engaging said commutator and adapted to impress the plate potential of said amplifier on one of the plates of the condenser when the scanning tube is viewing another standard of brightness, a second brush engaging the commutator and adapted to impress a predetermined comparison potential on the other plate of said condenser when the scanner tube is viewing said last named brightness standard, a compensating amplifier tube, means adapted to periodically make electrical contact with a condenser plate upon rotation of said commutator and connected to an input terminal of the compensating amplifier tube whereby to vary the voltage passed by the same in the event the condenser is in charged condition and in accordance with the intensity and direction of the charge, and means connecting the plate of said last named amplifier tube with the anode of said scanning tube whereby to effect corrections in the scanning tube voltage in accordance with the condition of the commutator condenser.

5. In a photoelectric sorting device of the type including a photoelectric scanning tube and a thermionic amplifier therefor, a device for automatically maintaining the setting of the machine comprising means for supplying operating potential to the scanning tube and amplifier, a rotatable commutator having a condenser thereon, a brush engaging said commutator and adapted to impress the plate potential of said amplifier on one of the plates of the condenser when the scanning tube is viewing a standard of brightness, a second brush engaging the commutator and adapted to impress a predetermined comparison potential on the other plate of said condenser when the scanner tube is viewing said brightness standard, a compensating amplifier tube, means adapted to periodically make electrical contact with a condenser plate upon rotation of said commutator and connected to an input terminal of the compensating amplifier tube whereby to vary the voltage passed by the same in the event the condenser is in charged condition and in accordance with the intensity and direction of the charge, and means connecting the plate of said last named amplifier tube with said scanning tube whereby to effect corrections in the scanning tube voltage in accordance with the condition of the commutator condenser.

6. In a photoelectric sorting device of the type including a photoelectric scanning tube and a thermionic amplifier therefor, a device for automatically maintaining the setting of the machine comprising means for supplying operating potential to the scanning tube and amplifier, a rotatable commutator having a condenser thereon, a brush engaging said commutator and adapted to impress the plate potential of said amplifier on one of the plates of the condenser when the scanning tube is viewing a standard of brightness, a second brush engaging the commutator and adapted to impress a predetermined comparison potential on the other plate of said condenser when the scanner tube is viewing said brightness standard, and means controlled by said condenser for varying the voltage applied to said scanning tube in accordance with the charge on the condenser when said plate potential exceeds said comparison potential or vice versa.

7. A compensating circuit for a photoelectric sorting machine including a photoelectric scanner tube, an amplifier tube therefor, a cathode ray tube having a deflecting plate thereof connected to the plate of the amplifier tube, and a voltage divider for providing an operating voltage for said tubes, said scanner tube being adapted to view articles to be sorted and also a pair of opposite brightness standards, means for periodically causing said amplifier tube to pass a predetermined standard output voltage when the scanner tube is viewing one of said brightness standards, said voltage being impressed on said deflecting plate to effect a deflection of the cathode ray beam to a predetermined point on the screen, and means for insuring a predetermined swing of said beam from said point when the photo-tube is viewing the other standard of brightness, comprising a rotary commutator carrying a condenser and a pair of conducting lugs connected to the respective condenser plates, a pair of brushes engaging said respective lugs when the scanning tube is scanning said other standard of brightness, one of said brushes being connected to the plate circuit of said amplifying tube to impress the voltage passed thereby on one of the condenser plates, the other of said brushes being connected to a point on the voltage divider at a comparison potential equal to and opposite in sign from said standard output voltage, said last named brush impressing said last named potential on the other commutator condenser plate whereby to cause the condenser to be charged in the event said comparison potential and the plate voltage of the amplifier tube are unequal, a pair of take-off brushes respectively engaging the conducting lugs, a compensating amplifier tube having the input terminals thereof connected to said take-off brushes, and means for supplying an operating potential to said photo-tube from the voltage divider, said last named means being connected to the plate of the compensating amplifier tube, whereby the scanner photo-tube voltage is opposed by the output voltage of the compensating amplifying tube to thereby vary the photo-tube voltage in accordance with the intensity and direction of the charge on the commutator condenser when charging thereof takes place.

8. A compensating circuit for a photoelectric sorting machine including a photoelectric scanner tube, an amplifier tube therefor, a cathode ray tube having a deflecting plate thereof connected to the plate of the amplifier tube, and a voltage divider for providing an operating voltage for said tubes, said scanner tube being adapted to view articles to be sorted and also a pair of opposite brightness standards, means for periodically causing said amplifier tube to pass a predetermined standard output voltage when the scanner tube is viewing one of said brightness standards, said voltage being impressed on said deflecting plate to effect a deflection of the cathode ray beam to a predetermined point on the screen, and means for insuring a predetermined swing of said beam from said point when the photo-tube is viewing the other standard of brightness, comprising a condenser, means operative when the scanning tube is scanning said other standard of brightness to connect the condenser plates respectively to the output voltage of said amplifying tube and to a point on the voltage divider at a comparison potential equal to and opposite in sign from said standard output voltage whereby to cause the condenser to be charged in the event said comparison potential and the plate voltage of the amplifier tube are unequal, a compensating amplifier tube, and means for connecting an input terminal of said last named tube with a plate of said condenser and for connecting the output of said last named tube with the scanning tube to thereby vary the photo-tube voltage in accordance with the intensity and direction of the charge on the condenser when charging thereof takes place.

9. A compensating circuit for a photoelectric machine including a photoelectric scanner tube, and an amplifier tube therefor, said scanner tube being adapted to view a pair of opposite brightness standards, means for periodically causing said amplifier tube to pass a predetermined standard output voltage when the scanner tube is viewing one of said brightness standards, and means for insuring a predetermined deviation from said standard voltage when the photo-tube is viewing the other standard of brightness, comprising a condenser, means operative when the scanning tube is scanning said other standard of brightness to connect the condenser plates respectively to the output voltage and to a comparison potential bearing a predetermined relation to said standard output voltage whereby to cause the condenser to be charged in the event said comparison potential and the plate voltage of the amplifier tube are unequal, a compensating amplifier tube, and means for connecting an input terminal of said last named tube with a plate of said condenser and for connecting the output of said last named tube with the scanning tube to thereby vary the photo-tube voltage in accordance with the intensity and direction of the charge on the condenser when charging thereof takes place.

10. In a photoelectric sorting machine of the type described, including a photoelectric scanner tube, an amplifier tube therefor, and means for supplying operating voltage for said tubes, said scanner tube being adapted to view articles to be sorted and a pair of brightness standards, a compensating mechanism for maintaining the setting of the machine comprising means for causing said amplifier tube to pass a predetermined standard voltage when the scanner tube is viewing one of said brightness standards, and means for insuring a predetermined deviation from said standard voltage when the photo-tube is viewing the other standard of brightness, comprising a condenser, means operative when the scanning tube is scanning said other standard of brightness for impressing on one of the condenser plates a comparison potential having a predetermined relation to said standard voltage and for connecting the other condenser plate to the output of the amplifier tube, whereby to charge the condenser in the event said comparison potential and amplifier tube output voltage are unequal, a compensating amplifier tube, and means for periodically connecting the input terminals of said last named tube to the plates of said condenser, the plate of said compensating amplifier tube being connected to the anode of the scanner photo-tube in opposition to the flow of polarizing voltage thereto from said voltage supply means whereby to vary the photo-tube voltage in accordance with the condenser charge.

11. In a machine of the type described, including a photoelectric scanner tube, an amplifier tube therefor, and means for supplying operating voltage for said tubes, said scanner tube being adapted to view a pair of brightness standards, a compensating mechanism for maintaining the setting of the machine comprising means for causing said amplifier tube to pass a predetermined standard voltage when the scanner tube is viewing one of said brightness standards, and means for insuring a predetermined deviation from said standard voltage when the photo-tube is viewing the other standard of brightness, comprising a condenser, means operative when the scanning tube is scanning said other standard of brightness for impressing on one of the condenser plates a comparison potential having a predetermined relation to said standard voltage and for connecting the other condenser plate to the output of the amplifier tube, whereby to charge the condenser in the event said comparison potential and amplifier tube output voltage are unequal, a compensating amplifier tube, and means for periodically connecting an input terminal of said last named tube to a plate of said condenser, the plate of said compensating amplifier tube being connected to the scanner photo-tube whereby to vary the photo-tube voltage in accordance with the condenser charge.

12. In a machine of the type described, including a photoelectric scanner tube, an amplifier tube therefor, and means for supplying operating voltage for said tubes, said scanner tube being adapted to view a pair of brightness standards, a compensating mechanism for maintaining the setting of the machine comprising means for causing said amplifier tube to pass a predetermined standard voltage when the scanner tube is viewing one of said brightness standards, and means for insuring a predetermined deviation from said standard voltage when the photo-tube is viewing the other standard of brightness, comprising a condenser, means operative when the scanning tube is scanning said other standard of brightness for impressing on one of the condenser plates a comparison potential having a predetermined relation to said standard voltage and for connecting the other condenser plate to the output of the amplifier tube, whereby to charge the condenser in the event said comparison potential and amplifier tube output voltage are unequal, and means for impressing a charge arising on said condenser on the scanner photo-tube whereby to vary the photo-tube voltage in accordance with the condenser charge.

13. A photoelectric machine of the type described having a scanner photo-tube, an amplifier therefor, and a signal emitting device adapted to operate throughout a predetermined range in response to voltages impressed thereon from said amplifier, and means for maintaining constant the limits of said range notwithstanding variations in photo-tube sensitivity and the like, comprising means for supplying operating voltage for said tube and amplifier, means for producing a predetermined standard voltage at the output of said amplifier when said scanner tube is viewing a given standard of brightness, means operative when the scanner tube is viewing an opposite brightness standard for comparing the output voltage of said amplifier at that time with a comparison potential equal in amount to and opposite in sign from said standard voltage, and means for varying the photo-tube voltage in accordance with the difference in amount of said comparison potential and amplifier output voltage.

14. A photoelectric machine of the type described having a scanner photo-tube, an amplifier therefor, and a signal emitting device adapted to operate throughout a predetermined range in response to voltages impressed thereon from said amplifier, and means for maintaining constant the limits of said range notwithstanding variations in photo-tube sensitivity and the like, comprising means for supplying operating voltage for said tube and amplifier, means for producing a predetermined standard voltage at the output of said amplifier when said scanner tube is viewing a certain standard of brightness, means operative when the scanner tube is viewing a different standard of brightness for comparing the output voltage of the amplifier with a comparison potential bearing a predetermined relation to said standard voltage, and means for varying the photo-tube voltage in accordance with the difference between said output voltage and comparison potential.

15. In a photoelectric classifying machine, a photoelectric scanner tube for scanning objects, an amplifier therefor, and means for compensating for variations in output voltage of the amplifier due to changes in illumination of objects being scanned, photo-tube sensitivity and the like, comprising a condenser, means for periodically impressing on one plate of the condenser the output voltage of the amplifier and for impressing on the other plate of the condenser a predetermined comparison voltage, whereby said condenser becomes charged in the event said voltages are unequal, a compensating thermionic tube, means for periodically connecting the input terminals of said last named tube with the plates of said condenser, and means for connecting the plate of the compensating tube with the photoelectric tube whereby to vary the photo-tube voltage in accordance with charges on said condenser.

16. In a photoelectric classifying machine, a photoelectric scanner tube for scanning objects, an amplifier therefor, and means for compensating for variations in output voltage of the amplifier due to changes in illumination of objects being scanned, photo-tube sensitivity and the like, comprising a condenser, means for periodically impressing on one plate of the condenser the output voltage of the amplifier and for impressing on the other plate of the condenser a predetermined comparison voltage whereby said condenser becomes charged in the event said voltages are unequal, and means for varying the photo-tube voltage in accordance with charges on said condenser.

17. A photoelectric machine of the type described including a photoelectric scanner tube, an amplifier therefor, and means for compensating for variation in output voltage of the amplifier due to changes in photo-tube sensitivity and the like, comprising means for periodically comparing the output voltage of the amplifier with a predetermined comparison voltage to determine whether said voltages are equal, a compensating thermionic tube, means for periodically connecting the input terminals of said last named tube with said comparing means, and means for connecting the plate of the compensating tube with the photoelectric tube whereby to vary the photo-tube voltage in accordance with differences between said output and comparison voltages.

18. A photoelectric machine of the type described including a periodically energizable photoelectric scanner tube, an amplifier therefor, and means for automatically compensating for variation in output voltage of the amplifier due to changes in photo-tube sensitivity and the like, comprising means synchronized with one of the periods of energization of the tube for periodically comparing the output voltage of the amplifier with a predetermined comparison voltage to determine whether said voltages are equal, and means responsive to said comparing means to vary the photo-tube voltage in accordance with differences between said output and comparison voltages.

19. A photoelectric machine of the type described having a scanner photo-tube, an amplifier therefor, and a signal emitting device adapted to operate throughout a predetermined range in response to voltages impressed thereon from said amplifier, and means for maintaining constant the limits of said range notwithstanding variations in brightness of illumination of articles being sorted, photo-tube sensitivity and the like, comprising means for supplying operating voltage for said tube and amplifier, means for producing a predetermined standard voltage at the output of said amplifier when said scanner tube is viewing a given standard of brightness, a condenser, means for impressing the output voltage of said amplifier on a plate of said condenser when the scanner tube is viewing a different standard of brightness and for simultaneously connecting the other plate of the condenser with a comparison potential bearing a predetermined relation to said standard voltage, said condenser becoming charged in the event that said comparison potential and output voltage are unequal, and means for varying the photo-tube voltage in accordance with the charge on the condenser.

20. A photoelectric machine of the type described having a scanner photo-tube, different standards of brightness movable relative to said photo-tube to be successively viewed by the same, an amplifier therefor, and a selector device adapted to operate throughout a predetermined range in response to voltages impressed thereon from said amplifier, and means for maintaining constant the limits of said range notwithstanding variations in brightness of illumination of articles being sorted, photo-tube sensitivity and the like, comprising means for producing a predetermined standard voltage at the output of said amplifier when said scanner tube is viewing a given standard of brightness, and means operative when the scanner tube is viewing a different standard of brightness for comparing the output voltage of the amplifier with a comparison potential bearing a predetermined relation to said standard voltage to ascertain differences between said output voltage and comparison potential.

21. An automatic compensating circuit for a sorting machine including a photo-sensitive element whose sensitivity varies with the applied voltage thereof, said element being adapted to view articles to be sorted and a standard of brightness, and an amplifier receiving the output of said element, said circuit comprising means adapted to be periodically connected to the output of said amplifier and to a fixed predetermined comparison potential when said photo-sensitive element is exposed to a given standard of brightness and to receive an electrical charge equal in value to the difference between the output voltage of the amplifier and said comparison potential, and regulating means connected to said last named means and periodically energized thereby in proportion to the charge thereon, said regulating means being connected to said photo-sensitive element to vary the photo-tube voltage in proportion to said charges.

22. An automatic compensating circuit for a sorting machine including a photo-sensitive element whose sensitivity varies with the applied voltage thereof, said element being adapted to view articles to be sorted and a standard of brightness, and an amplifier receiving the output of said element, said circuit comprising means connected to the output of said amplifier and to a fixed predetermined comparison potential when said photo-sensitive element is exposed to a given standard of brightness to receive an electrical charge equal in value to the difference between the output voltage of the amplifier and said comparison potential, and regulating means connected to said last named means and energized thereby in proportion to the charge thereon, said regulating means being connected to said photosensitive element to vary the photo-tube voltage in proportion to said charges.

23. An automatic compensating circuit for a machine of the type described including a photo-sensitive scanning element adapted to view articles and a predetermined control standard, and an amplifier receiving the output of said element, said circuit comprising comparison means connected to the output of said amplifier and to a fixed predetermined comparison potential and adapted to be electrically energized in proportion to the difference in value between the output voltage of the amplifier and said comparison potential when said photo-sensitive element is exposed to said control standard, and means connected to said photo-sensitive element and to said comparison means and adapted to be energized by the latter to vary the photo-tube voltage in response to energization of the comparison means.

24. A photoelectric machine of the type described including a periodically energizable photoelectric scanner tube, polarizing connections therefor, and means for compensating for variation in output voltage of the tube due to changes in photo-tube sensitivity and the like, comprising means synchronized with one of the periods of energization of the tube for periodically comparing the output voltage of the tube with a comparison voltage to determine whether said voltages are equal, and means connected to said polarizing connections responsive to said comparing means to vary the photo-tube voltage in accordance with differences between said output and comparison voltages.

25. An automatic compensating circuit for a machine of the type described including a photo-sensitive scanning element adapted to view articles and a control standard, said circuit comprising comparison means connected to the output of said scanning element and to a comparison potential and adapted to be electrically energized in proportion to the difference in value between the output voltage of the element and said comparison potential when said photo-sensitive element is exposed to said control standard, and means connected to said photo-sensitive element and to said comparison means and adapted to be energized by the latter to vary the photo-tube voltage in response to energization of the comparison means.

DAVID C. COX.